United States Patent
Ahmad et al.

(10) Patent No.: US 7,546,412 B2
(45) Date of Patent: Jun. 9, 2009

(54) APPARATUS, SYSTEM, AND METHOD FOR GLOBAL METADATA COPY REPAIR

(75) Inventors: Said Abdullah Ahmad, Tucson, AZ (US); Rhea Reyes Frondozo, Tucson, AZ (US); Kurt Allen Lovrien, Tucson, AZ (US); Jacob Lee Sheppard, Gilbert, AZ (US)

(73) Assignee: International Business Machines Corporation, Armonk, NY (US)

( * ) Notice: Subject to any disclaimer, the term of this patent is extended or adjusted under 35 U.S.C. 154(b) by 250 days.

(21) Appl. No.: 11/292,646

(22) Filed: Dec. 2, 2005

(65) Prior Publication Data

US 2007/0130421 A1    Jun. 7, 2007

(51) Int. Cl.
G06F 12/00    (2006.01)

(52) U.S. Cl. .............. 711/112; 711/156; 711/165; 711/161; 711/162; 714/6

(58) Field of Classification Search .............. 711/112, 711/162
See application file for complete search history.

(56) References Cited

U.S. PATENT DOCUMENTS

| | | | |
|---|---|---|---|
| 5,051,887 A | 9/1991 | Berger et al. | 364/200 |
| 5,553,285 A | 9/1996 | Krakauer et al. | 395/600 |
| 5,835,954 A | 11/1998 | Duyanovich et al. | 711/162 |
| 5,897,661 A | 4/1999 | Baranovsky et al. | 711/170 |
| 6,502,205 B1 | 12/2002 | Yanai et al. | 714/7 |
| 6,877,011 B2 * | 4/2005 | Jaskiewicz | 707/102 |
| 2002/0199058 A1 * | 12/2002 | Ofek | 711/112 |

* cited by examiner

*Primary Examiner*—Hetul Patel
(74) *Attorney, Agent, or Firm*—Kunzler & McKenzie

(57) ABSTRACT

An apparatus, system, and method are disclosed for global metadata copy repair. The apparatus includes a control module for copying global metadata from primary storage to target storage, a verification module configured to identify invalid track in the global metadata, a location module configured to maintain a current read address, and a read module configured to find a valid copy of the invalid track. The system includes a plurality of hosts, a storage controller in communication with the plurality of hosts over a network, a primary storage device, a target storage device, and the apparatus. The method includes copying global metadata from a primary storage device to a target storage device, identifying invalid track in the global metadata of the primary storage device, maintaining a current read address of a buffer read, and finding a valid copy of the invalid track.

11 Claims, 7 Drawing Sheets

APPARATUS, SYSTEM, AND METHOD FOR GLOBAL METADATA COPY REPAIR

BACKGROUND OF THE INVENTION

1. Field of the Invention

This invention relates to storing and using metadata in multiple storage locations and more particularly relates to copy repair of global metadata stored in multiple storage locations.

2. Description of the Related Art

The explosion of data created by e-business is making storage a strategic investment priority for companies of all sizes. As storage takes precedence, two major concerns have emerged: business continuity and business efficiency. Business continuity requires storage that supports data availability so employees, customers and trading partners can access data continuously through reliable, disaster-tolerant systems. Business efficiency, where storage is concerned, is the need for investment protection, reduced total cost of ownership and high performance and manageability.

In order to maintain the large amounts of data created and collected, storage area networks (SANs) have been developed. The Storage Network Industry Association (SNIA) defines SAN as a network whose primary purpose is the transfer of data between computer systems and storage elements. A SAN may comprise a communication infrastructure, which provides physical connections; and a management layer, which organizes the connections, storage elements, and computer systems so that data transfer is secure and robust. A SAN may also be a storage subsystem comprising storage elements, storage devices, computer systems, and/or appliances, plus all control software, communicating over a network.

Commonly, a storage area network includes a plurality of storage devices, such as tape drives or hard disk drives, connected with a storage or disk controller. The disk controller is generally a server that is configured to process read/write requests from hosts or client machines. The hosts may be running a variety of operating systems such as Windows, Linux, UNIX, AIX, etc. In large computing environments, the storage area network is an ideal solution for providing large amounts of storage and scalable server or storage controller performance.

Typically, in a storage area network environment, a host requests data from the disk controller. The disk controller then retrieves the data from the particular storage device that contains the requested data, often referred to as a home location. The disk controller then sends the data to the host. If the host modifies the data, the data is sent back to the disk controller which returns the modified data to the home location. Typically, the host awaits a response from the disk controller indicating the read or write operation has completed.

The disk controller may also provide functions such as the ability to access devices by heterogeneous servers, a data cache, data availability features such as various RAID implementations, scalability, virtualization of devices, and replication services.

In storage subsystems, large amounts of critical data known as Global Metadata (GD) maintain important subsystem configuration data. The subsystem configuration data may include file system configuration data, space usage quotas, access control lists, and extended attributes. To ensure that GD is highly available, the disk controller store three redundant copies on chosen RAID arrays. The three redundant copies are known as primary, secondary, and tertiary copies.

When a track of the GD becomes unusable the disk controller is currently configured to discard the entire copy of the metadata, and use an alternative usable copy of the GD to copy onto a target RAID array. Unfortunately, a major disadvantage of discarding an entire copy of the GD is that multiple copies of GD may be found unusable or unreadable thereby causing the disk controller to discard all copies of the GD and subsequently lose all access to the GD. Additionally, other problems include unnecessary churn of GD RAID arrays and possible loss of redundancy during the initial boot up of the storage subsystem because new arrays are not allowed to be copied at boot up time.

From the foregoing discussion, it should be apparent that a need exists for an apparatus, system, and method that prevent discarding of entire copies of global metadata. Beneficially, such an apparatus, system, and method would mark a track as unusable and find a usable copy of that track, or mark the track as invalid so that the owner of the track will perform a recovery action, and perform one or the other without discarding an entire copy of the GD.

SUMMARY OF THE INVENTION

The present invention has been developed in response to the present state of the art, and in particular, in response to the problems and needs in the art that have not yet been fully solved by currently available copy systems for global metadata. Accordingly, the present invention has been developed to provide an apparatus, system, and method for global metadata copy repair that overcome many or all of the above-discussed shortcomings in the art.

The apparatus for global metadata copy repair is provided with a plurality of modules configured to functionally execute the necessary steps of repairing invalid tracks found in copies of global metadata. These modules in the described embodiments include a control module configured to copy global metadata from a primary storage device to a target storage device, the primary and target storage devices comprising a plurality of tracks, and a verification module configured to identify invalid tracks in the global metadata of the primary storage device.

In a further embodiment, the apparatus includes a location module configured to maintain a current read address of a buffer read, and a read module configured to find a valid copy of the invalid tracks and send a buffer write of the valid tracks to the primary storage device and the target storage device. The control module is further configured to not discard an entire copy of the global metadata having invalid tracks.

The read module may be configured to repair invalid tracks found in copies of global metadata having invalid tracks by overwriting invalid tracks with the valid copies of the invalid tracks from a secondary storage device. Additionally, the read module is further configured to find valid copies of invalid tracks in the secondary storage device. The apparatus also includes a plurality of storage devices, each storage device having a copy of the global metadata. In one embodiment, the read module is further configured to subsequently search one copy of global metadata from one of the plurality of storage devices after another until finding the valid copy of the invalid track.

In a further embodiment the control module is configured to promote one of the plurality of storage devices to secondary storage device upon failure of the secondary storage device. The control module is further configured to commence global metadata copy repair for the failed secondary storage device.

A system of the present invention is also presented for global metadata copy repair. In particular, the system, in one embodiment, includes a plurality of hosts, a storage controller in communication with the plurality of hosts over a network, the storage controller having a control module, a primary storage device, and a target storage device, each configured to maintain a copy of global metadata, and the apparatus.

A method of the present invention is also presented for global metadata copy repair. The method in the disclosed embodiments substantially includes the steps necessary to carry out the functions presented above with respect to the operation of the described apparatus and system. In one embodiment, the method includes copying global metadata from a primary storage device to a target storage device, the primary and target storage devices comprising a plurality of tracks, and identifying invalid tracks in the global metadata of the primary storage device.

The method, in a further embodiment, includes maintaining a current read address of a buffer read, and finding a valid copy of the invalid tracks and sending a buffer write of the valid tracks to the primary storage device and the target storage device. Furthermore, the method may include not discarding an entire copy of the global metadata having invalid tracks, and repairing invalid tracks found in copies of global metadata having invalid tracks by overwriting invalid tracks with the valid copies of the invalid tracks from a secondary storage device. In a further embodiment, the method comprises finding valid copies of invalid tracks in the secondary storage device.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
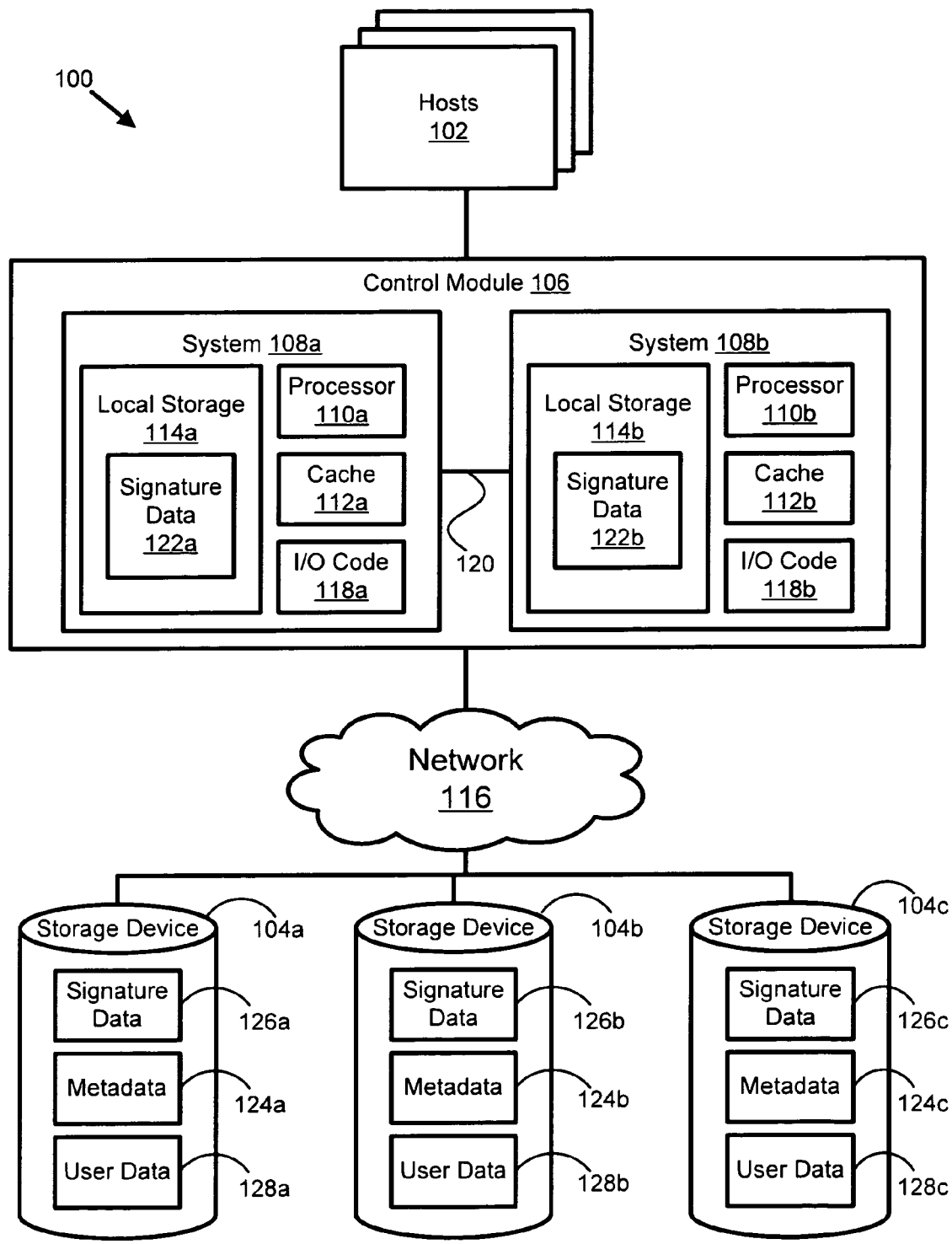
FIG. 1 is a schematic block diagram illustrating one embodiment of a computing environment in accordance with the prior art.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram illustrating one embodiment of a computing environment 100 in accordance with the prior art. In the computing environment 100, one or more hosts 102 communicate Input/Output (I/O) requests directed to storage devices 104a, 104b . . . 104n to a control module 106, where the control module 106 manages I/O access to the storage devices 104a, 104b . . . 104n. In one embodiment, the control module 106 may comprise a plurality of systems 108a, 108b, each including a processor 110a, 110b, a cache 112a, 112b, and a local storage 114a, 114b. Each system 106a, 106b may be on separate power boundary. The two systems 108a, 108b may cooperate as a redundancy pair to perform the operation of the control module 106 such that in the event of a failure of either system, the remaining system takes over the operation of the control unit in a non-disruptive manner.

The systems 106a, 106b may be assigned to handle I/O requests directed to specific volumes configured in the storage devices 104a, 104b . . . 104n. The systems 106a, 106b communicate with the storage devices 104a, 104b . . . 1104n over a device network 116, which may comprise a local area network (LAN), storage area network (SAN), bus interface, serial interface, etc. The processors 108a, 108b execute I/O code 118a, 118b to perform I/O and metadata management operations. The local storage 114a, 114b may comprise a non-volatile storage device, such as read-only memory or a hard disk drive.

The control module 106 may comprise any type of server, such as an enterprise storage server, storage controller, etc., or other device used to manage I/O requests to attached storage devices 104a, 104b . . . 104n, where the storage devices may comprise storage devices known in the art, such as interconnected hard disk drives (e.g., configured as a DASD, RAID, JBOD, etc.), magnetic tape, optical disks, electronic memory, etc. The hosts 102 may communicate with the control module 106 over a network (not shown), such as a Local Area Network (LAN), Storage Area Network (SAN), Wide Area Network (WAN), wireless network, etc. Alternatively, the hosts 102 may communicate with the control module 106 over a bus interface, such as a Peripheral Component Interconnect (PCI) bus or serial interface. The processors 110a, 110b may communicate with each other over a connection 120 to handle failover or fallback.

The systems 108a, 108b maintain signature data 122a, 122b in their local storage 114a, 114b that indicates the location of copies of global metadata (hereinafter "metadata") 124a, 124b, 124c in the storage devices 104a, 104b, 104c. Copies of the signature data 126a, 126b, 126c are also maintained with the metadata 124a, 124b, 124c. The copies of the metadata 124a, 124b, 124c may comprise critical metadata including critical configuration information needed for the control module 106 to operate. If the critical metadata becomes corrupted or is unavailable, then the location and configuration of volumes on the storage devices may be lost and the control module 106 may need to be reconfigured. The storage devices 104a, 104b, 104c further include user data 128a, 128b, 128c the hosts 102 access.

There may be more than the three storage devices 104a, 104b, 104c shown and certain storage devices may not include copies of metadata and signature data. Further, one storage device may include multiple copies of the signature data and metadata. In one embodiment, three copies of metadata and signature data are stored in one or more storage devices. In alternative embodiments, a different number of copies of metadata and signature data may be maintained.

Figure 2:
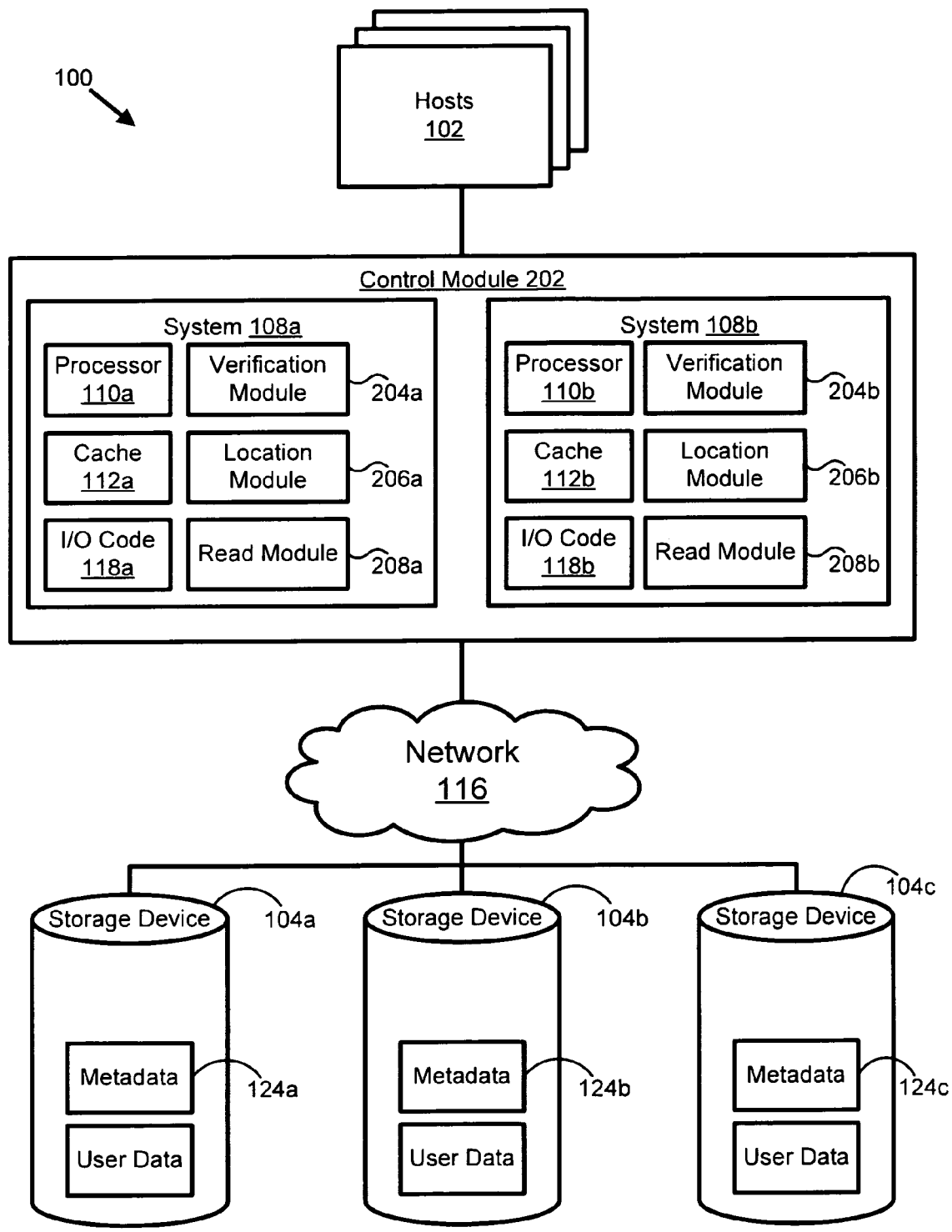
FIG. 2 is a schematic block diagram illustrating an embodiment of a computing environment in accordance with the present invention.

FIG. 2 is a schematic block diagram illustrating an embodiment of a computing environment 200 in accordance with the present invention. In one embodiment, the control module 202 and the system 203 of the computing environment 200 are similar to the control module 106 and system 108 of the computing environment discussed above, but further include a verification module 204, a location module 206 and a read module 208. Components such as the processor, cache, signature data, and I/O code have been omitted for clarity.

The control module 202 may be configured to maintain the integrity of the metadata 124a, 124b, 124c. For redundancy, multiple copies of metadata may be maintained across the storage devices 104a, 104b, 104c. Although FIG. 2 depicts three storage devices, the control module 202 may be scaled to control any number of storage devices 104a-104n, and corresponding metadata 124a-124n. The control module 202 is further configured to initiate copying of primary metadata, for example metadata 124a, to a target storage device. While the control module 202 copies data from the primary metadata 124a to the target storage device, the verification module 204 is configured to identify invalid tracks in the metadata 124a. One benefit of the control module 202 of the present invention is the ability of the control module 202 to overcome invalid tracks. Unlike the prior art, where invalid tracks would cause the entire copy of the metadata to be discarded, the control module 202 is configured to repair the invalid tracks.

The location module 206 is configured to maintain a current read address during the metadata copy procedure. The metadata copy procedure may also be referred to as a "buffer read." The read module 208 is configured to find a valid copy of the invalid tracks and send a buffer write of the valid tracks to the primary storage device 104a, thereby repairing the invalid tracks, and to the target storage device 104c. In one embodiment, the valid copy of the invalid track may be found in a secondary storage device 124b.

In a further embodiment, the read module 208 may be configured to search a plurality of storage devices 104a-104n to find a valid copy of the invalid tracks. For example, if a track of metadata 124a is invalid, and the read module 208 can not find valid copies in the metadata 124b to write to the target metadata 124c, the read module may continue searching metadata 124d-124n to find a valid copy of the invalid tracks. Furthermore, the read module 208 may subsequently search one copy of the metadata after another until finding the valid copy of the invalid track.

The control module 202, in one embodiment, may be further configured to promote one of the plurality of storage devices 104a, 104b, 104n to a secondary storage device upon failure of the secondary storage device 104b, and subsequently commence repairing the metadata of the failed storage device.

Figure 3:
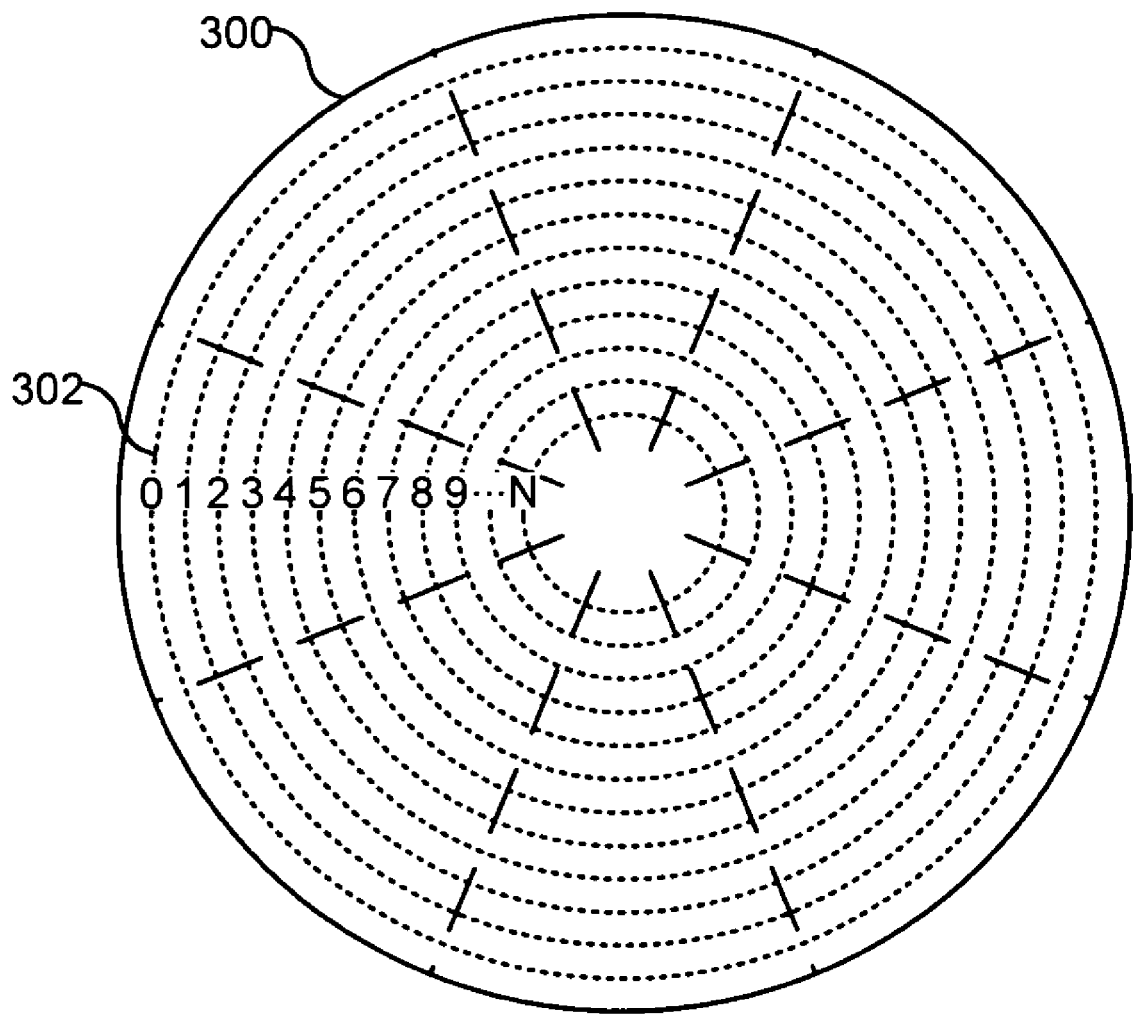
FIG. 3 is a schematic block diagram illustrating one embodiment of representative electronic storage media surface.

FIG. 3 is a schematic block diagram illustrating one embodiment of representative electronic storage media surface 300 having a plurality of tracks, similar to the surface of the storage media of the storage devices 104a, 104b, 104c.

The illustrated platter surface 300 shows visual demarcations indicating the electronic formatting that may be performed on the disk.

The depicted surface 300 is formatted to include a plurality of concentric tracks 302, which are numbered 0 through N and are indicated by the concentric dashed circles in the figure. As described above, tracks 302 may become invalid or corrupt, and therefore require repairing. Current technology allows each surface 300 to be formatted to include thousands of tracks 302 per inch and tens of thousands of tracks 302 across the usable surface 300 of the storage devices 104a, 104b, 104c.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 4:
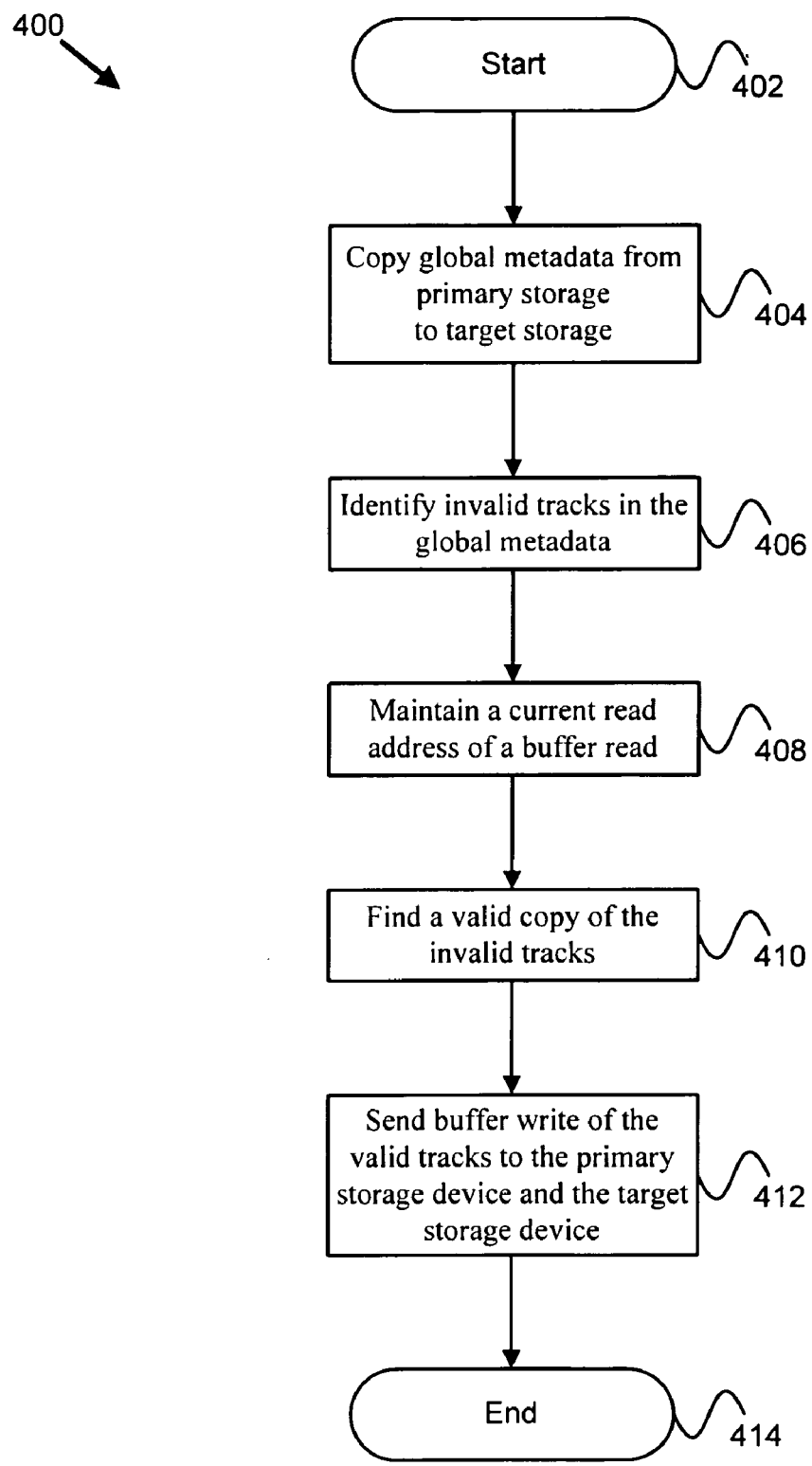
FIG. 4 is a schematic flow chart diagram illustrating one embodiment of a method for global metadata copy repair in accordance with the present invention.

FIG. 4 is a schematic flow chart diagram illustrating one embodiment of a method 400 for global metadata copy repair 400 in accordance with the present invention. The method 400 starts 402 and the control module 202 commences copying 404 global metadata from the primary storage 104a to the target storage 104c, for example. In one embodiment, copying 404 comprises issuing a read buffer command to the primary storage 104a and subsequently a write buffer command to the target storage 104c.

As the control module 202 copies 404 data from the primary storage 104a to the target storage 104c, the verification module 204 identifies 406 invalid tracks in the global metadata. If an invalid track is identified, the control module 202 stops the buffer read and the location module maintains 408 the address of the buffer read prior to the stoppage. In one embodiment, the read module 208 then begins to find 410 a valid copy of the invalid tracks. For example, the read module 208 may search the copy of the global metadata 124b that is stored on a secondary storage device 104b. Alternatively, the read module 208 searches for valid copies of the invalid tracks, searching through copies of global metadata 124b, 124d, . . . 124n until finding 410 a valid copy of the invalid tracks. The read module 208 subsequently sends 412 a buffer write of the valid copy to the primary storage 104a and the target storage 104c. The method 400 then ends 414.

Figure 5:
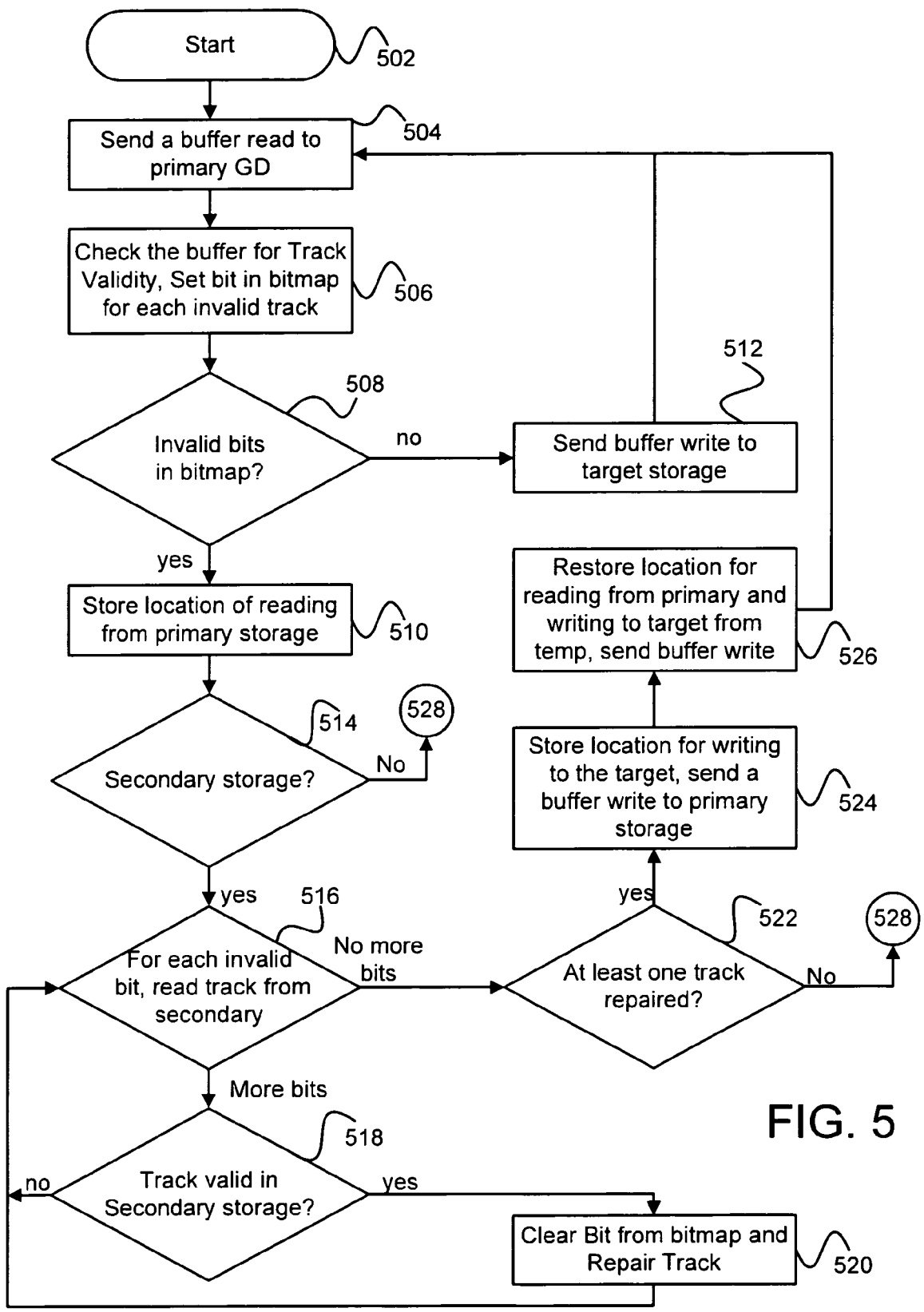
FIGS. 5 and 6 are schematic flow chart diagrams illustrating an alternative embodiment of a method for global metadata copy repair in accordance with the present invention.
Figure 6:
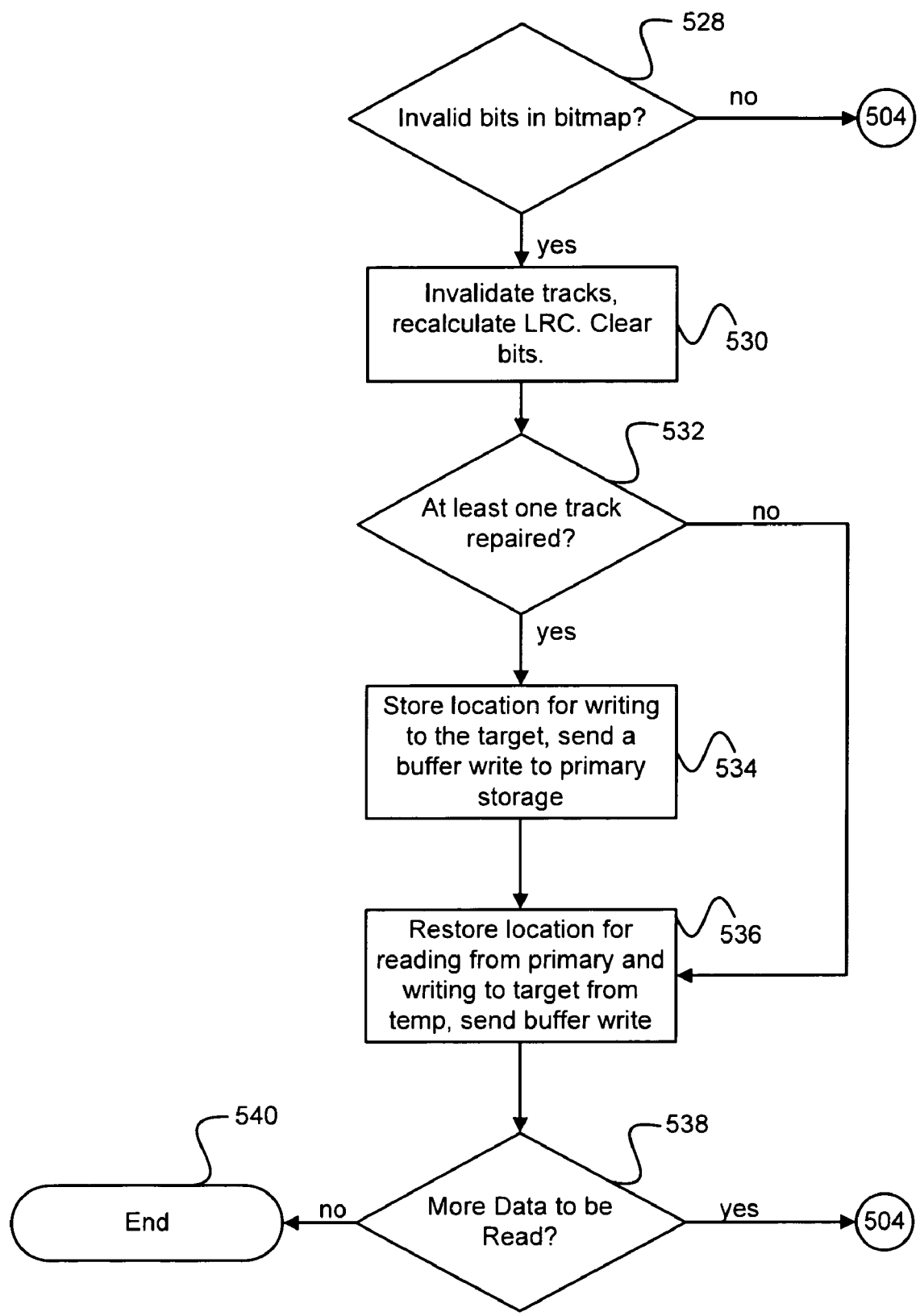

FIGS. 5 and 6 are schematic flow chart diagrams illustrating an alternative embodiment of a method 500 for global metadata copy repair in accordance with the present invention. In one embodiment, the method 500 starts and the control module 202 sends 504 a buffer read to the primary storage device 104a having the primary global metadata 124a. In one embodiment, the primary storage device 104a is a disk in a Redundant Array of Inexpensive Disks (RAID). The verification module 206 then checks 506 the read buffer for track validity. In a further embodiment, the location module 206 maintains a bitmap having a plurality of bits. Each bit in the bitmap may represent one track of the global metadata 124.

When the verification module 204 encounters an invalid track, the location module 206 marks the corresponding bit. For example, a bit in the bitmap having a value of '1' may indicate an invalid track.

Once the verification module 204 finds an invalid track and subsequently marks the bit in the bitmap as invalid 508, the location module 206 stores 510 the current location of the buffer read. If there are no invalid bits in the bitmap 508, the read module 208 sends 512 a buffer write to the target storage device 104c having the target global metadata 124c, and the control module continues sending 502 a buffer read as described above.

In a further embodiment, the method 500 continues and once the location module stores 510 the current location of the buffer read, the control module checks 514 for a secondary storage device 104b having secondary global metadata 124b. For each invalid bit in the bitmap, the read module reads 516 valid copies of the invalid track as long as a bitmap for the secondary global metadata 124b indicates 518 that the bit and therefore the corresponding track is valid in the secondary global metadata 124b. If the bit is valid 518 in the bitmap for the secondary global metadata 124b, then the read module clears 520 the bit from the bitmap and repairs the invalid track in the primary global metadata 124a. If the bit indicates that the track is also invalid in the secondary global metadata 124b, then the read module 208 may continue searching copies of global metadata 124, one-by-one, until finding a valid copy of the invalid track.

Once all of the bits indicating invalid tracks have been cleared 520 by the read module 208, and there are no more bits 516, the control module checks to see if at least one track was repaired 522. If at least one track was repaired 522, the location module 206 stores 524 the location for writing to the target 104c, and the read module sends a buffer write to the primary storage device 104a. The control module 202 then restores 526 the location for the buffer read from the primary storage device 104a and the location for writing to the target storage device 104c from the location module 206, and sends a buffer write to the target storage device 104c. The control module 202 then continues sending 504 a buffer read as described above.

If there is no secondary storage device 104b, or there was not at least one track repaired 522, the method 500 continues, and the verification module 204 checks 528 (see FIG. 6) for invalid bits in the bitmap. If there are still invalid bit in the bitmap, the control module 202 invalidates the tracks 530, recalculates a longitudinal redundancy check (LRC) and clears the bits. In one embodiment, invalidating 530 the tracks may comprise a flag on the track indicating to the owner of the invalid track that the track needs to be restored the next time the owner attempts to access the track. If there are 528 no invalid bits in the bitmap, the control module continues sending 504 a buffer read as described above.

In a further embodiment, after the control module 202 invalidates 530 the tracks, if at least one track was repaired 532, the location module 206 stores 534 the location for writing to the target 104c, and the read module sends a buffer write to the primary storage device 104a. The control module 202 then restores 536 the location for the buffer read from the primary storage device 104a and the location for writing to the target storage device 104c from the location module 206, and sends a buffer write to the target storage device 104c.

If control module 202 detects that there is 538 more data to be read, the control module 202 continues sending 504 a buffer read to the primary storage device 104a. If there is no more data to be read, the method 500 ends 540.

Figure 7:
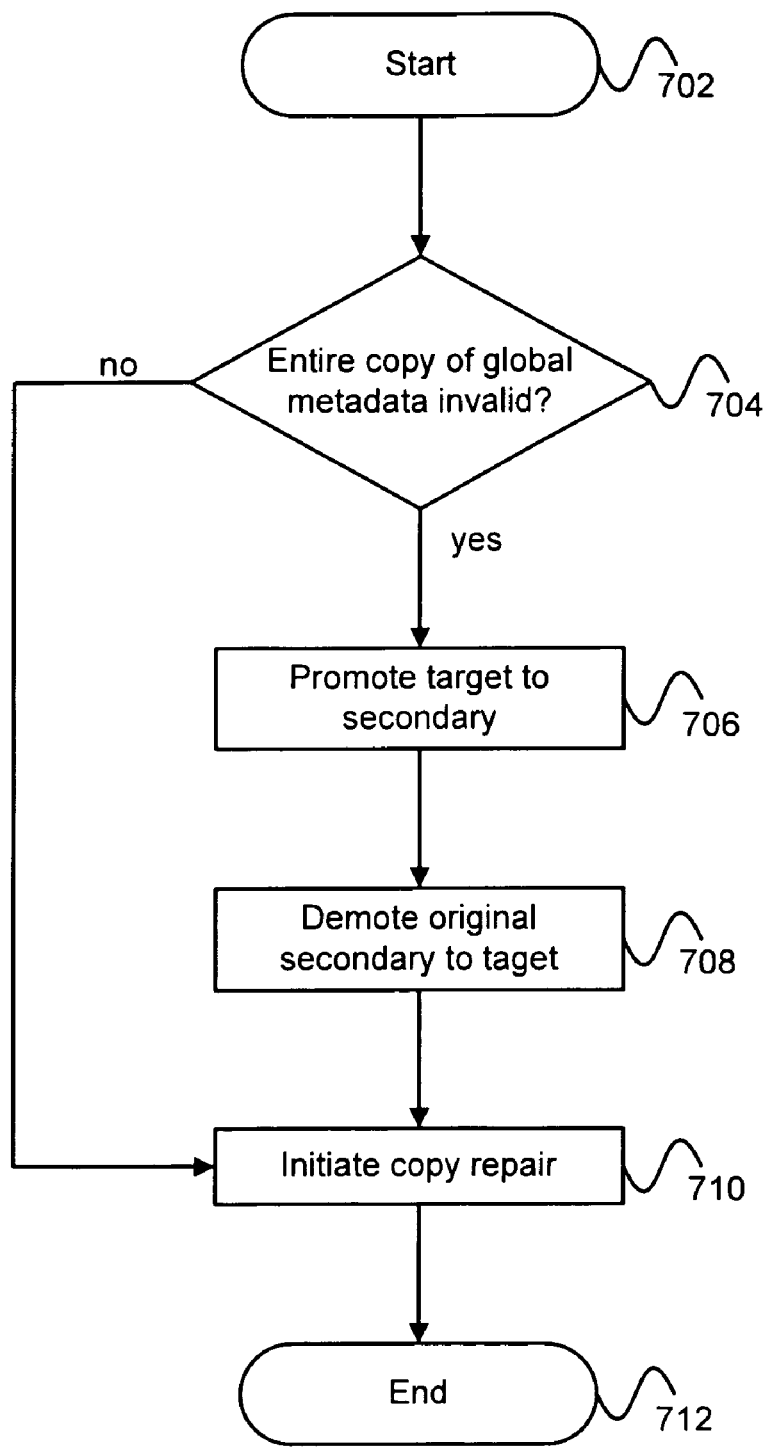
FIG. 7 is a schematic flow chart diagram illustrating one embodiment of a method for promoting a backup copy of the global metadata in accordance with the present invention.

FIG. 7 is a schematic flow chart diagram illustrating one embodiment of a method 700 for promoting a backup copy of the global metadata in accordance with the present invention. In one embodiment, the method 700 starts 702 and the control module 202 detects 704 that an entire copy of global metadata (GD) has become invalid. In a further embodiment, the control module 202 is only concerned with the health of the secondary global metadata 124b. If the entire copy of secondary global metadata becomes invalid 704, the control module promotes 706 the target storage device 104c to become the secondary backup, or secondary storage device 104b.

In one embodiment, the control module 202 then demotes 708 the original or failed secondary storage device 104b to become the target storage device 104c in order to begin to repair the copy of global metadata residing on the failed storage device. The control module 202 then initiates 710 a copy repair procedure. In one embodiment, the copy repair procedure is the method 500 described above with regards to FIGS. 5 and 6. The method 700 then ends 712.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for global metadata copy repair, the apparatus comprising a semiconductor device storing executable code executed by a processor and comprising:
   a control module configured to copy global metadata from a primary storage device to a target storage device by issuing a buffer read to the primary storage device and subsequently issuing a buffer write to the target storage device, the primary and target storage devices comprising a plurality of track and the global metadata comprising file system configuration data, space usage quotas, access control lists, and extended attributes;
   a verification module configured to identify an invalid first track in the global metadata of the primary storage device, maintain a bitmap with one bit representing each track of the global metadata, mark a bit for the invalid first track, and clear a bit for each valid second track;
   a location module configured to maintain a current read address of the buffer read prior to the invalid first track and a write location for writing the invalid first track to the target storage device;
   a read module configured to find a valid copy of the first track on a secondary storage device, send a buffer write of the valid copy of the first track to the primary storage device at the current read address overwriting the invalid first track on the primary storage device, and concurrently send a buffer write of the valid copy of the first track to the target storage device at the write location, writing the valid copy of the first track to the target storage device; and
   if no valid copy of the first track is found, the location module is further configured to invalidate the first track of which no valid copy is found, recalculate a longitudinal redundancy check (LRC) for the global metadata, clear the bit in the bitmap for the invalid first track, and write a flag for the invalid first track, the flag requesting restoration of the invalid first track when an owner accesses the invalid first track.

2. The apparatus of claim 1, wherein the control module is further configured to not discard an entire copy of the global metadata having the invalid first track.

3. The apparatus of claim 1, further comprising a plurality of storage devices, each storage device having a copy of the global metadata.

4. The apparatus of claim 1, wherein the control module is further configured to commence global metadata copy repair for a failed secondary storage device.

5. A system for global metadata copy repair, the system comprising:
   a plurality of hosts;
   a storage controller in communication with the plurality of hosts over a network, the storage controller having a control module;
   a primary storage device, and a target storage device, each configured to maintain a copy of global metadata;
   a semiconductor device storing executable code executed by a processor and comprising:
      the control module configured to copy global metadata from the primary storage device to the target storage device by issuing a buffer read to the primary storage device and subsequently issuing a buffer write to the target storage device, the primary and target storage devices comprising a plurality of tracks and the global metadata comprising file system configuration data, space usage quotas, access control lists, and extended attributes;
      a verification module configured to identify an invalid first track in the global metadata of the primary storage device, maintain a bitmap with one bit representing each track of the global metadata, mark a bit for the invalid first track, and clear a bit for each valid second track;
      a location module configured to maintain a current read address of the buffer read prior to the invalid first track and a write location for writing the invalid first track to the target storage device;
      a read module configured to find a valid copy of the first track on a secondary storage device, send a buffer write of the valid copy of the first track to the primary storage device at the current read address overwriting the invalid first track on the primary storage device, and concurrently send a buffer write of the valid copy of the first track and to the target storage device at the write location, writing the valid copy of the first track to the target storage device; and
      if no valid copy of the first track is found, the location module is further configured to invalidate the first track of which no valid copy is found, recalculate a longitudinal redundancy check (LRC) for the global metadata, clear the bit in the bitmap for the invalid first track, and write a flag for the invalid first track, the flag requesting restoration of the invalid first track when an owner accesses the invalid first track.

6. The system of claim 5, wherein the control module is further configured to not discard an entire copy of the global metadata having the invalid first track.

7. The system of claim 5, further comprising a plurality of storage devices, each storage device having a copy of the global metadata.

8. The system of claim 7, wherein the control module is further configured to promote one of the plurality of storage devices to secondary storage device upon failure of the secondary storage device.

9. The system of claim 8, wherein the control module is further configured to commence global metadata copy repair for the failed secondary storage device.

10. A executable code stored on a semiconductor device and executed by a processor to perform an operation for global metadata copy repair, the operation comprising:

copying global metadata from a primary storage device to a target storage device by issuing a buffer read to the primary storage device and subsequently issuing a buffer write to the target storage device, the primary and target storage devices comprising a plurality of tracks and the global metadata comprising file system configuration data, space usage quotas, access control lists, and extended attributes;

identifying an invalid first track in the global metadata of the primary storage device;

maintaining a bitmap with one bit representing each track of the global metadata;

marking a bit for the invalid first track;

clearing a bit for each valid second track;

maintaining a current read address of the buffer read prior to the invalid first track and a write location for writing the invalid first track to the target storage device;

finding a valid copy of the first track on a secondary storage device;

sending a buffer write of the valid copy of the first track to the primary storage device at the current read address overwriting the invalid first track on the primary storage device and concurrently sending a buffer write of the valid copy of the first track to the target storage device at the write location, writing the valid copy of the first track to the target storage device;

if no valid copy of the first track is found,
  invalidating the first track of which no valid copy is found;
  recalculating a longitudinal redundancy check (LRC) for the global metadata;
  clearing the bit for invalid the first track; and
  writing a flag for the invalid first track, the flag requesting restoration of the invalid first track when an owner accesses the invalid first track.

11. The program of claim 10, further comprising an operation to not discard an entire copy of the global metadata having the invalid first track.

* * * * *